United States Patent
Tsushima

(10) Patent No.: US 11,287,341 B2
(45) Date of Patent: Mar. 29, 2022

(54) PRESSURE SENSOR HAVING A HIGH-STRENGTH BONDED STRUCTURE

(71) Applicant: AZBIL CORPORATION, Chiyoda-ku (JP)

(72) Inventor: Ayumi Tsushima, Chiyoda-ku (JP)

(73) Assignee: AZBIL CORPORATION, Chiyoda-ku (JP)

(*) Notice: Subject to any disclaimer, the term of this patent is extended or adjusted under 35 U.S.C. 154(b) by 14 days.

(21) Appl. No.: 16/872,830

(22) Filed: May 12, 2020

(65) Prior Publication Data
US 2020/0363279 A1  Nov. 19, 2020

(30) Foreign Application Priority Data

May 16, 2019 (JP) .............................. JP2019-092779

(51) Int. Cl.
*G01L 9/00* (2006.01)
(52) U.S. Cl.
CPC .................................. *G01L 9/0042* (2013.01)
(58) Field of Classification Search
None
See application file for complete search history.

(56) References Cited

U.S. PATENT DOCUMENTS

2019/0285496 A1* 9/2019 Takimoto ............... G01L 19/148
2020/0025638 A1* 1/2020 Tsushima ............. H01L 41/1132
2020/0145035 A1* 5/2020 Sasaki ................... F16B 41/002
2020/0326255 A1* 10/2020 Takimoto ............... G01L 9/0072
2020/0400523 A1* 12/2020 Takimoto ................ G01L 19/00
2021/0123826 A1* 4/2021 Tushima ................. G01L 13/02

FOREIGN PATENT DOCUMENTS

JP          2017-116456 A       6/2017

OTHER PUBLICATIONS

Combined Chinese Office Action and Search Report dated Jul. 7, 2021 in Patent Application No. 202010405469.9 (with English language translation), 14 pages
Ma Dongwei, "Adhesive Preparation and Application," Chemical Industry Press, Sep. 1998, 8 pages (with partial English language translation).

* cited by examiner

*Primary Examiner* — Andre J Allen
*Assistant Examiner* — Jermaine L Jenkins
(74) *Attorney, Agent, or Firm* — Oblon, McClelland, Maier & Neustadt, L.L.P.

(57) ABSTRACT

A pressure sensor includes a sensor diaphragm, a pressure-chamber defining member joined to a sensor diaphragm, the pressure-chamber defining member including a recess and a through hole that is open in the recess, the recess having an opening closed by the sensor diaphragm, a connecting pipe having a first end portion inserted into the through hole while being exposed to the recess and bonded to the hole with an adhesive, and a pressure transmission medium filled in the recess and the connecting pipe. A space is disposed around the first end portion of the connecting pipe, and the adhesive is not disposed at the first end portion of the connecting pipe.

7 Claims, 4 Drawing Sheets

PRESSURE SENSOR HAVING A HIGH-STRENGTH BONDED STRUCTURE

CROSS-REFERENCE TO RELATED APPLICATIONS

The present application is based on and claims priority to Japanese Application No. 2019-092779, filed May 16, 2019, the entire contents of which are incorporated herein by reference.

BACKGROUND

1. Field

The present disclosure relates to a pressure sensor.

2. Description of the Related Art

A technology relating to a pressure sensor including a capillary inserted and fixed in a pressure transmission hole has been developed. An example of such a technology is described in Japanese Unexamined Patent Application Publication No. 2017-116456.

SUMMARY

For example, the technology described in Japanese Unexamined Patent Application Publication No. 2017-116456 can be used to concurrently achieve pressure resistance improvement and thermal stress reduction. Here, in the technology described in Japanese Unexamined Patent Application Publication No. 2017-116456, the capillary is joined to an inner wall surface of the pressure transmission hole with an adhesive. When, for example, the capillary is a pipe with an ultrasmall diameter, as exemplarily described in Japanese Unexamined Patent Application Publication No. 2017-116456, a capillary action may occur to allow the adhesive to creep up in the pressure transmission hole. The capillary action blocks the capillary with the adhesive, and thus blocks the pressure transmission path, so that the pressure sensor fails to accurately measure the pressure.

As described above, to prevent a pressure transmission path from being blocked with an adhesive without causing a capillary action, a gap between the hole wall surface (corresponding to the inner wall surface of the pressure transmission hole described in Japanese Unexamined Patent Application Publication No. 2017-116456) and a connecting pipe (corresponding to the capillary described in Japanese Unexamined Patent Application Publication No. 2017-116456) may be expanded. In this structure, however, the adhesive layer is increased, and the properties such as shear strength or tensile strength may be degraded.

The present disclosure aims to provide a pressure sensor capable of securing a pressure transmission path while having a high-strength bonded structure.

To achieve this object, a pressure sensor according to the present disclosure includes a sensor diaphragm that has a plate shape and that is displaced in response to receiving pressure, a pressure-chamber defining member joined to a sensor diaphragm, the pressure-chamber defining member including a recess and a hole that is open in the recess, the recess having an opening closed by the sensor diaphragm, a connecting pipe having a first end portion inserted into the hole while being exposed to the recess and bonded to the hole with an adhesive, the connecting pipe serving as a pressure transmission path that transmits pressure to the sensor diaphragm, and a pressure transmission medium filled in the recess and the connecting pipe to transmit pressure. A space is disposed around the first end portion of the connecting pipe, and the adhesive is not disposed at the first end portion of the connecting pipe.

In the pressure sensor according to the present disclosure, the space may be formed from a countersink in an opening of the hole.

In the pressure sensor according to the present disclosure, the countersink may extend parallel to a longitudinal direction of the connecting pipe.

In the pressure sensor according to the present disclosure, the pressure-chamber defining member may include a first member including the recess and the countersink, and a second member including a hole portion with a smaller hole diameter than the countersink of the hole, the second member being joined to the first member.

In the pressure sensor according to the present disclosure, the first member and the second member may be formed from different materials.

In the pressure sensor according to the present disclosure, the opening of the hole may be tapered with an inside diameter gradually increasing toward the recess, and the space may be disposed between the opening of the hole and the connecting pipe.

In the pressure sensor according to the present disclosure, the first end portion of the connecting pipe may be thinner than a portion on a second end.

The present disclosure enables securing of a pressure transmission path and a high-strength bonded structure.

DETAILED DESCRIPTION

First Embodiment

Figure 1:
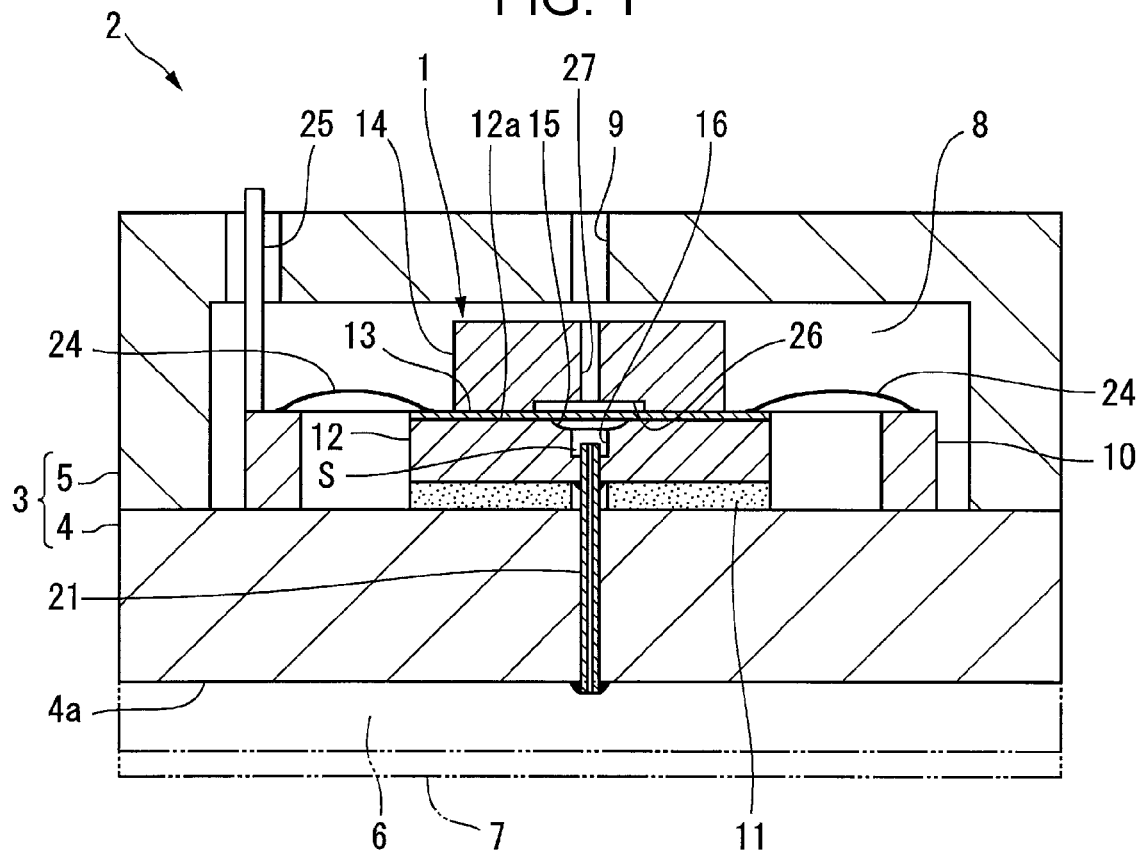
FIG. 1 is a cross-sectional view of a pressure sensor according to the present disclosure.

A pressure sensor according to an embodiment of the present disclosure will be described in detail below with reference to FIGS. 1 and 2. A pressure sensor 1 illustrated in a center portion of FIG. 1 is disposed in a body 3 of an absolute pressure transmitter 2. The body 3 includes a base body 4, at the lowermost position in FIG. 1, and a cover body 5, joined to the base body 4. The base body 4 and the cover body 5 are formed from stainless steel.

A main surface 4a of the base body 4 facing away from the cover body 5 serves as part of a wall of a pressure receiving chamber 6. The pressure receiving chamber 6 is filled with a pressure transmission medium, not illustrated. The pressure transmission medium is a liquid that transmits pressure. An example of the pressure transmission medium is silicone oil. The pressure receiving chamber 6 bears the pressure of a measurement target fluid via a barrier diaphragm 7. The cover body 5 has a box shape that is open toward the base body 4, and defines a sensor chamber 8 inside, together with the base body 4. The sensor chamber 8 is open to the atmosphere via a vent hole 9 formed in the cover body 5. The sensor chamber 8 accommodates the pressure sensor 1 and a relay substrate 10.

The pressure sensor 1 includes a pressure-chamber defining member 12, bonded to the base body 4 with an adhesive 11, a sensor diaphragm 13, joined to the pressure-chamber defining member 12, and a path defining member 14, joined to the sensor diaphragm 13. The pressure-chamber defining member 12, the sensor diaphragm 13, and the path defining member 14 are formed from silicon. The sensor diaphragm 13 is formed from a thinner plate than the path defining member 14 to be displaced in a thickness direction in response to receiving pressure.

The pressure-chamber defining member 12 includes a recess 15, which is open in a main surface 12a at a first end to which the sensor diaphragm 13 is joined, and a through-hole 16, which is open in the bottom of the recess 15. The opening of the recess 15 is closed by the sensor diaphragm 13. The recess 15 defines a pressure chamber 17 (refer to FIG. 2) in cooperation with the sensor diaphragm 13. The recess 15 is shaped to have a curved surface (aspheric surface) to follow the displacement of the sensor diaphragm 13.

As illustrated in FIG. 1, the through-hole 16 receives a connecting pipe 21. The connecting pipe 21 is a metal pipe functioning as a pressure transmission path through which pressure is transmitted to the sensor diaphragm 13. In the present embodiment, the through-hole 16 corresponds to a "hole" in the present disclosure. The structure of the through-hole 16 will be described below. The connecting pipe 21 extends through the base body 4, and, as illustrated in FIG. 2, and is bonded to the through-hole 16 of the pressure-chamber defining member 12 with an adhesive 22 while having a first end portion 21a inserted into the pressure-chamber defining member 12.

The connecting pipe 21 has a circular cross section when viewed in the longitudinal direction. Examples of the adhesive 22 include an epoxy adhesive and solder. The first end portion 21a of the connecting pipe 21 is inserted into the through-hole 16 while being exposed to the recess 15. The first end portion 21a of the connecting pipe 21 is surrounded by a space S, and the adhesive 22 is not disposed at the first end portion 21a of the connecting pipe 21. The pressure receiving chamber 6, the connecting pipe 21, and the pressure chamber 17 (recess 15) including the through-hole 16 are filled with a pressure transmission medium, not illustrated. The pressure in the pressure receiving chamber 6 is transmitted to the pressure chamber 17 through a pressure transmission path 23 (refer to FIG. 2) formed in the connecting pipe 21.

A bridge circuit (not illustrated) that converts displacement of the sensor diaphragm 13 to an electric signal is disposed at a portion of the sensor diaphragm 13 facing the recess 15. The bridge circuit is connected to an external output pin 25 of the relay substrate 10 via a bonding wire 24.

A circular recess 26 is formed at a portion of the path defining member 14 facing the recess 15 of the pressure-chamber defining member 12 across the sensor diaphragm 13. A vent hole 27, which extends through the path defining member 14, is open at the center portion of the circular recess 26. The circular recess 26 thus has atmospheric pressure.

Figure 2:
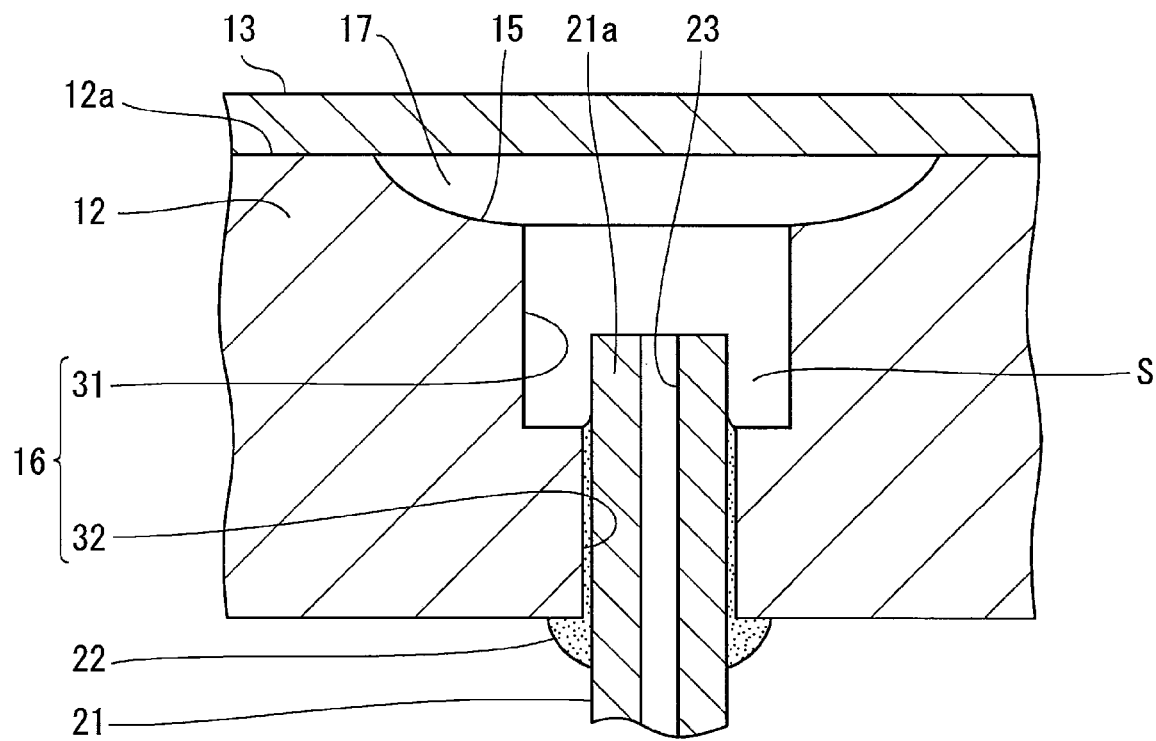
FIG. 2 is an expanded cross-sectional view of a main portion.

As illustrated in FIG. 2, the through-hole 16 of the pressure-chamber defining member 12 includes a countersink 31, which is open to the recess 15, and a hole portion 32, to which the connecting pipe 21 is bonded. The countersink 31 is open in a circular shape. The inside diameter of the countersink 31 is larger than the inside diameter of the hole portion 32. The countersink 31 may be formed by, for example, etching or abrasive blasting. The countersink 31 extends parallel to the longitudinal direction of the connecting pipe 21. The hole portion 32 has such an inside diameter that an adhesive layer is formed between the hole wall surface and the connecting pipe 21.

The first end portion 21a of the connecting pipe 21 protrudes into the countersink 31. The inside diameter of the countersink 31 according to the present embodiment has such a diameter that a space S wider than a gap for the adhesive 22 to creep up the first end portion 21a of the connecting pipe 21 due to a capillary action is formed around the first end portion 21a of the connecting pipe 21. To bond the connecting pipe 21 to the pressure-chamber defining member 12, firstly, the connecting pipe 21 is inserted into the hole portion 32 of the through-hole 16, and the adhesive 22 is poured into the hole portion 32 from the opening on the side facing away from the countersink 31. The adhesive 22 creeps up to the bottom of the countersink 31 due to the capillary action through a minute gap between the hole wall surface of the hole portion 32 and the connecting pipe 21.

The countersink 31 has a space S between itself and the first end portion 21a of the connecting pipe 21 in which no capillary action occurs. Thus, the adhesive 22 that has crept up to the countersink 31 due to the capillary action does not creep up into the countersink 31 along the connecting pipe 21.

Thus, the adhesive 22 does not arrive at the leading end of the connecting pipe 21, so that the connecting pipe 21 is prevented from being blocked with the adhesive 22.

The present embodiment can thus provide a pressure sensor that can secure a pressure transmission path while having a high-strength bonded structure.

In the present embodiment, the space around the first end portion 21a of the connecting pipe 21, that is, the space S having an area that does not cause a capillary action is formed of the countersink 31 in the opening of the through-hole 16. This structure can thus prevent the adhesive 22 from creeping up due to the capillary action while the connecting pipe 21 is held in the through-hole 16. Here, the sensor diaphragm 13 is prevented from coming into contact with the connecting pipe 21 when being displaced along the recess 15.

The countersink 31 according to the present embodiment extends parallel to the longitudinal direction of the connecting pipe 21. Thus, the countersink 31 can be formed while the through-hole 16 is formed in the pressure-chamber defining member 12, which facilitates formation of the countersink 31.

Second Embodiment

Figure 3:
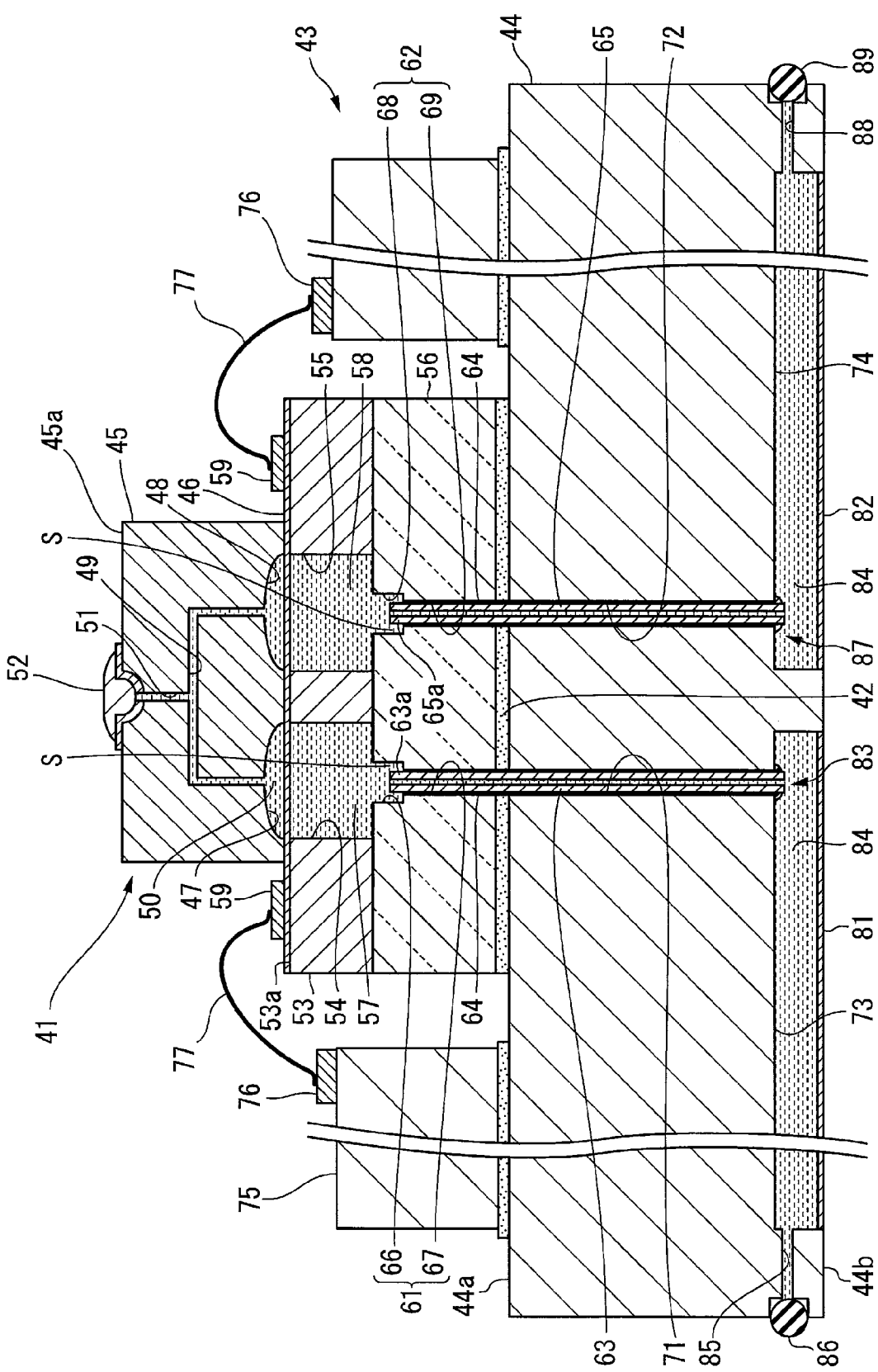
FIG. 3 is a cross-sectional view of a differential pressure transmitter.

As illustrated in FIG. 3, a pressure sensor according to the present disclosure is installable in a differential pressure transmitter. A pressure sensor 41 located at the top in FIG. 3 is a differential sensor, installed on a diaphragm base 44 of a differential pressure transmitter 43 via an adhesive 42. A path defining member 45 of the pressure sensor 41 according to the present embodiment includes a first recess 47 and a second recess 48, closed by a sensor diaphragm 46, and a through hole 49, which connects the first recess 47 and the second recess 48. The first recess 47, the second recess 48, and the through hole 49 are filled with a pressure transmission medium 50. The pressure transmission medium 50 is poured from a fill-in hole 51 connected to the through hole 49. The fill-in hole 51 is open in a first end surface 45a of the path defining member 45, and closed with a sealant 52.

The sensor diaphragm 46 is held between the path defining member 45 and a support member 53. The path defining member 45, the sensor diaphragm 46, and the support member 53 are formed from silicon. The support member 53 has a first through-hole 54 and a second through-hole 55 at positions opposing the first and second recesses 47 and 48 of the path defining member 45 with the sensor diaphragm 46 interposed therebetween. The inside of the first through-hole 54 and the inside of the second through-hole 55 serve as a first pressure chamber 57 and a second pressure chamber 58 while the sensor diaphragm 46 and an insulating member 56 are joined to the support member 53.

At portions of the sensor diaphragm 46 opposing the first recess 47 and the second recess 48, bridge circuits (not illustrated) that convert displacement of the sensor diaphragm 46 into electric signals are disposed. These bridge circuits are connected to electrode pads 59 disposed at side portions of the sensor diaphragm 46.

The insulating member 56 is formed from glass, and electrically insulated from the support member 53 and the diaphragm base 44. In the present embodiment, the support member 53 and the insulating member 56 form "a pressure-chamber defining member" in the present disclosure. In the present embodiment, "recesses" in the present disclosure are formed from the first and second through-holes 54 and 55 and part of the insulating member 56. A main surface 53a of the support member 53 to which the sensor diaphragm 46 is joined corresponds to "a main surface at a first end" in the present disclosure.

A third through-hole 61 is formed in a portion of the insulating member 56, and serves as a wall of the first pressure chamber 57. A fourth through-hole 62 is formed in a portion of the insulating member 56, and serves as a wall of the second pressure chamber 58. In the present embodiment, the third through-hole 61 and the fourth through-hole 62 correspond to "holes open in a recess" in the present disclosure. A first connecting pipe 63 is inserted into the third through-hole 61 while being bonded thereto with an adhesive 64. A second connecting pipe 65 is inserted into the fourth through-hole 62 while being bonded thereto with the adhesive 64. Examples usable as the adhesive 64 include an epoxy adhesive or solder.

The third through-hole 61 is formed from a first countersink 66, which is open in the first pressure chamber 57, and a first hole portion 67, to which a first connecting pipe 63 is bonded. The fourth through-hole 62 is formed from a second countersink 68, which is open in the second pressure chamber 58, and a second hole portion 69, to which a second connecting pipe 65 is bonded. The inside diameter of the first countersink 66 and the second countersink 68 is such that the space that does not allow the adhesive 64 to creep up due to a capillary action is formed around first end portions 63a and 65a of the first and second connecting pipes 63 and 65.

The first end portions 63a and 65a of the first connecting pipe 63 and the second connecting pipe 65 are accommodated in the first and second countersinks 66 and 68. As illustrated in FIG. 3, when the first and second pressure chambers 57 and 58 are deeper than the depth to which the sensor diaphragm 46 is displaceable, the first end portions 63a and 65a of the first and second connecting pipes 63 and 65 can be inserted into the first and second pressure chambers 57 and 58. In this case, the third and fourth through-holes 61 and 62 do not need to have the first countersink 66 and the second countersink 68.

The first and second connecting pipes 63 and 65 are inserted into the fifth and sixth through-holes 71 and 72 of the diaphragm base 44, and extend through the diaphragm base 44. Second end portions of the first and second connecting pipes 63 and 65 are open in the first and second pressure receiving chambers 73 and 74, having walls some of which are formed by the diaphragm base 44.

The diaphragm base 44 is formed in a predetermined shape from, for example, a metal material such as stainless steel. A relay substrate 75 is formed adjacent to the pressure sensor 41 on a first (upper side in FIG. 3) main surface 44a of the diaphragm base 44 facing the insulating member 56. Electrode pads 76 and multiple external output pins, not illustrated, are disposed on the relay substrate 75. The electrode pads 76 are connected to the external output pins with wires, not illustrated. The electrode pads 76 are connected to the electrode pads 59 of the sensor diaphragm 46 via bonding wires 77. Thus, the bridge circuits of the sensor diaphragm 46 are electrically connected to circuits such as a signal processing circuit or a power circuit not illustrated, via the electrode pads 59 facing the sensor diaphragm 46, the bonding wires 77, the electrode pads 76 facing the relay substrate 75, and external output pins.

A first pressure receiving chamber 73 and a second pressure receiving chamber 74, which are recesses open in the direction away from the insulating member 56, are formed in a second main surface 44b of the diaphragm base 44. The opening of the first pressure receiving chamber 73 is closed by a first barrier diaphragm 81. The opening of the second pressure receiving chamber 74 is closed by a second barrier diaphragm 82. Although not illustrated, the first barrier diaphragm 81 serves as part of a wall of a low-pressure fluid path through which the measurement target fluid flows, and is joined to the diaphragm base 44. The second barrier diaphragm 82 serves as part of a wall of a high-pressure fluid path through which the measurement target fluid flows, and is joined to the diaphragm base 44.

The first pressure receiving chamber 73, the inside of the first connecting pipe 63, the countersink 66 of the third through-hole 61, and the first pressure chamber 57 form a first pressure transmission path 83, which transmits pressure exerted on the first barrier diaphragm 81 to the sensor diaphragm 46, and are filled with an oil 84, serving as a pressure transmission medium. The oil 84 is poured into the first pressure receiving chamber 73 from a first oil-introduction hole 85, formed at one side portion of the diaphragm base 44. The first oil-introduction hole 85 is closed by a first stopper 86 after the oil is poured.

The second pressure receiving chamber 74, the inside of the second connecting pipe 65, the countersink 68 of the fourth through-hole 62, and the second pressure chamber 58 form a second pressure transmission path 87, through which the pressure exerted on the second barrier diaphragm 82 is transmitted to the sensor diaphragm 46, and are filled with the oil 84, serving as a pressure transmission medium, as in the case of the first pressure transmission path 83. The oil 84 in the second pressure transmission path 87 is poured into the second pressure receiving chamber 74 through a second oil-introduction hole 88 formed at a second end of the diaphragm base 44. The second oil-introduction hole 88 is closed by a second stopper 89 after the oil is poured.

In the differential pressure transmitter 43 with this structure, the pressure of the measurement target fluid exerted on the first barrier diaphragm 81 is transmitted to the first pressure chamber 57 via the oil 84. The pressure of the measurement target fluid exerted on the second barrier diaphragm 82 is transmitted to the second pressure chamber 58 via the oil 84. Thus, the pressure is transmitted to the first pressure chamber 57 and the second pressure chamber 58, so that the sensor diaphragm 46 is displaced, and the pressure sensor 41 detects the differential pressure.

A space S having such an area that does not allow the adhesive 64 to creep up due to an capillary action is formed around each of the first end portion 63*a* of the first connecting pipe 63 and the first end portion 65*a* of the second connecting pipe 65, as illustrated in FIG. 3. This structure thus prevents the adhesive 64 from creeping up along the first end portions 63*a* and 65*a* of the first and second connecting pipes 63 and 65, so that the first and second connecting pipes 63 and 65 are prevented from being clogged with the adhesive 64.

The present embodiment can thus provide a pressure sensor (differential sensor) that can secure a transmission path while having a high-strength bonded structure.

Pressure-Chamber Defining Member and Connecting Pipe According to Modification Example As illustrated in FIG. 4 to FIG. 9, a space that does not cause a capillary action may be formed around the connecting pipe. In FIG. 4 to FIG. 9, components the same as those described in FIG. 1 and FIG. 2 are denoted with the same reference signs without being described in detail.

Figure 4:
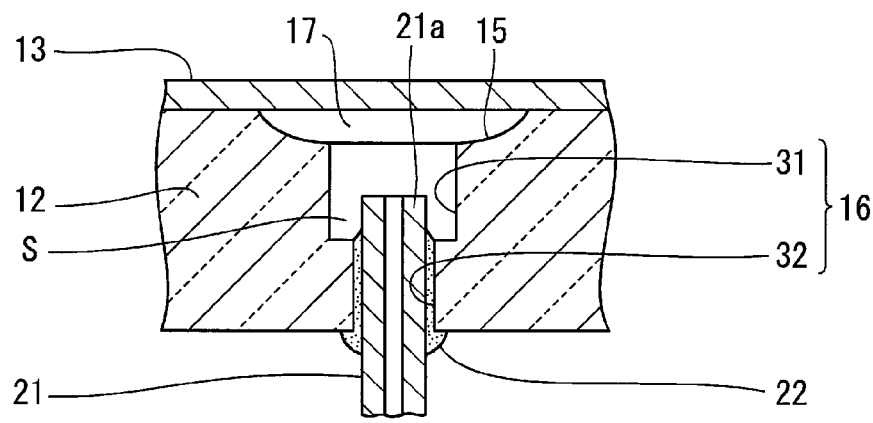
FIG. 4 is a cross-sectional view of another embodiment.

The pressure-chamber defining member 12 illustrated in FIG. 4 is formed from glass, and joined to the silicon-made sensor diaphragm 13. The material of the pressure-chamber defining member 12 is not limited to silicon, and, may be any material usable as the base of a sensor chip, such as, glass, stainless steel, or Kovar as illustrated in FIG. 4.

Figure 5:
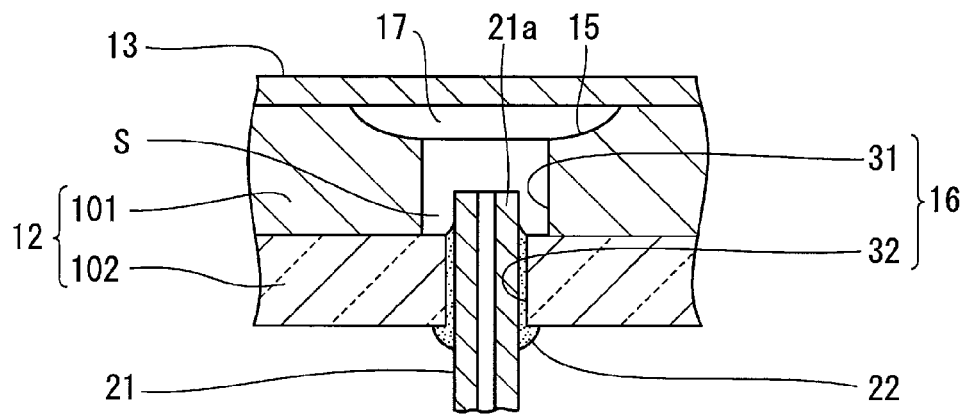
FIG. 5 is a cross-sectional view of another embodiment.

The pressure-chamber defining member 12 illustrated in FIG. 5 includes a first member 101, including the recess 15 and the countersink 31, and a second member 102, including the hole portion 32 with a smaller hole diameter than the countersink 31 of the through-hole 16. The second member 102 is joined to the first member 101. This structure eliminates the need of forming a stepped through-hole in one member, and thus facilitates formation of the through-hole 16.

In the structure illustrated in FIG. 5, the first member 101 and the second member 102 may be formed from different materials. For example, the first member 101 may be formed from silicon, and the second member 102 may be formed from glass.

Figure 6:
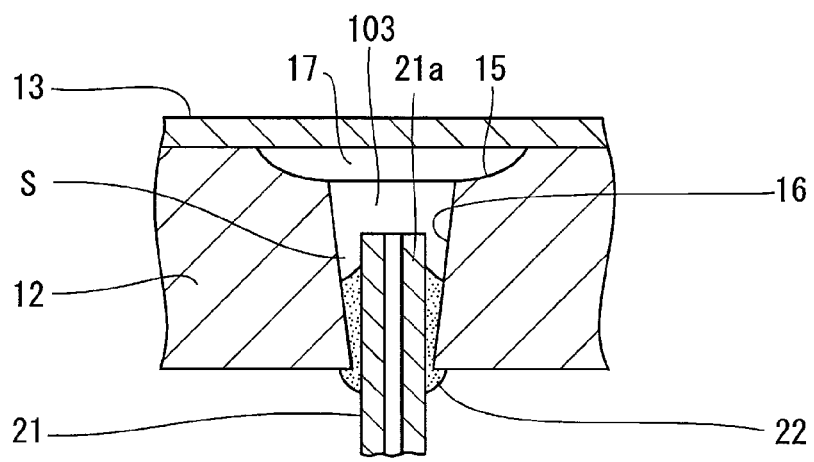
FIG. 6 is a cross-sectional view of another embodiment.
Figure 7:
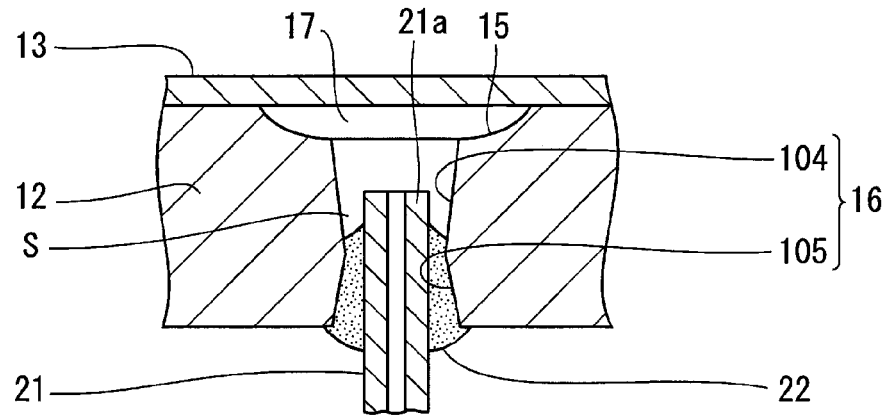
FIG. 7 is a cross-sectional view of another embodiment.

The first end portion of the through-hole 16 that is open to the recess 15 illustrated in FIG. 6 and FIG. 7 is tapered with the inside diameter gradually increasing toward the recess 15. The through-hole 16 illustrated in FIG. 6 has a taper surface 103 with the inside diameter gradually increasing from the opening facing away from the recess 15 to the opening facing the recess 15.

The through-hole 16 illustrated in FIG. 7 includes a first taper portion 104, which has its inside diameter gradually increasing toward a first end open to the recess 15, and a second taper portion 105, which has its inside diameter gradually increasing toward a second end facing away from the recess 15. The structure illustrated in FIG. 7 facilitates an operation of pouring the adhesive 22 into the through-hole 16 through the second taper portion 105.

Figure 8:
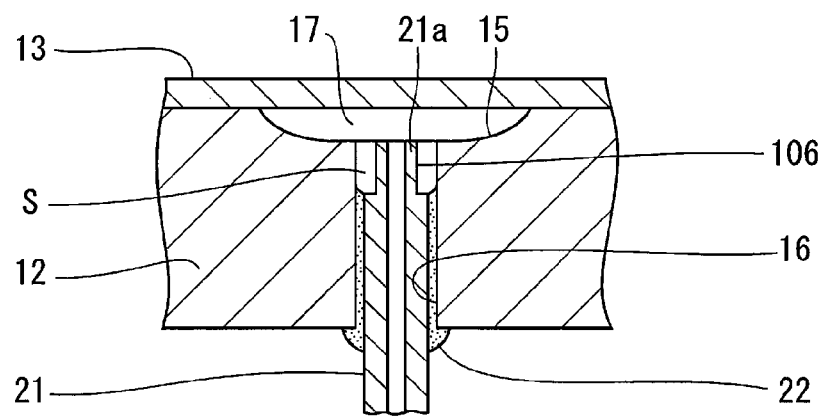
FIG. 8 is a cross-sectional view of another embodiment.
Figure 9:
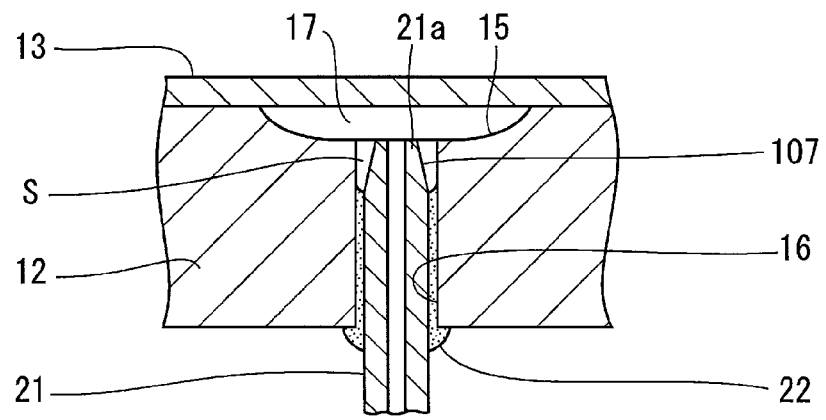
FIG. 9 is a cross-sectional view of another embodiment.

The through-hole 16 illustrated in FIG. 8 and FIG. 9 is formed to have a uniform inside diameter from the first end to the second end. The first end portion 21*a* of the connecting pipe 21 illustrated in FIG. 8 and the FIG. 9 is thinner than the portion at the second end. Specifically, the first end portion 21*a* of the connecting pipe 21 illustrated in FIG. 8 is formed from a hollow cylinder 106, thinner than the other portion. The first end portion 21*a* of the connecting pipe 21 illustrated in FIG. 9 has a taper surface 107 having an outside diameter gradually decreasing toward the leading end. In the structure illustrated in FIG. 8 and FIG. 9, the space S having such an area that does not allow the adhesive 22 to creep up due to a capillary action can be formed by processing the connecting pipe 21, which is more easily processible than silicon. Thus, the present disclosure can be easily achieved.

Thus far, embodiments of the present disclosure have been described in detail with reference to the attached drawings. However, the technical scope of the present disclosure is not limited to these embodiments. It is clear that persons having an ordinary skill in the art can conceive of various modification examples within the scope of technical ideas described in the scope of claims, and these modification examples naturally pertain to the technical scope of the present disclosure.

What is claimed is:

1. A pressure sensor, comprising:
a sensor diaphragm that has a plate shape and that is displaced in response to receiving pressure;
a pressure-chamber defining member joined to the sensor diaphragm, the pressure-chamber defining member including a recess and a hole that is open in the recess, the recess having an opening closed by the sensor diaphragm;
a connecting pipe having a first end portion inserted into the hole while being exposed to the recess and bonded to the hole with an adhesive, the connecting pipe serving as a pressure transmission path that transmits pressure to the sensor diaphragm; and
a pressure transmission medium filled in the recess and the connecting pipe to transmit pressure,
wherein a space is disposed around the first end portion of the connecting pipe, and the adhesive is not disposed at the first end portion of the connecting pipe, and
wherein the first end portion of the connecting pipe is thinner than a portion at a second end.

2. The pressure sensor according to claim 1, wherein the space is formed from a countersink in an opening of the hole.

3. The pressure sensor according to claim 2, wherein the countersink extends parallel to a longitudinal direction of the connecting pipe.

4. The pressure sensor according to claim 1,
wherein the opening of the hole is tapered with an inside diameter gradually increasing toward the recess, and
wherein the space is disposed between the opening of the hole and the connecting pipe.

5. A pressure sensor, comprising:
a sensor diaphragm that has a plate shape and that is displaced in response to receiving pressure;
a pressure-chamber defining member joined to the sensor diaphragm, the pressure-chamber defining member including a recess and a hole that is open in the recess, the recess having an opening closed by the sensor diaphragm;
a connecting pipe having a first end portion inserted into the hole while being exposed to the recess and bonded to the hole with an adhesive, the connecting pipe serving as a pressure transmission path that transmits pressure to the sensor diaphragm; and
a pressure transmission medium filled in the recess and the connecting pipe to transmit pressure, wherein a space is disposed around the first end portion of the connecting pipe, and the adhesive is not disposed at the first end portion of the connecting pipe, wherein the space is formed from a countersink in an opening of the hole, wherein the countersink extends parallel to a longitudinal direction of the connecting pipe, and wherein the pressure-chamber defining member includes a first member including the recess and the countersink, and a second member including a hole portion with a smaller hole diameter than the countersink of the hole, the second member being joined to the first member.

6. The pressure sensor according to claim 5, wherein the first member and the second member are formed from different materials.

7. The pressure sensor according to claim 5, wherein the first end portion of the connecting pipe is thinner than a portion at a second end.

* * * * *